UNITED STATES PATENT OFFICE.

JOHN H. WRIGHT, OF LOUISVILLE, KENTUCKY.

HYDRAULIC LIME.

SPECIFICATION forming part of Letters Patent No. 460,697, dated October 6, 1891.

Application filed November 17, 1890. Serial No. 371,685. (No specimens.)

*To all whom it may concern:*

Be it known that I, JOHN H. WRIGHT, a citizen of the United States, residing at Louisville, in the county of Jefferson and State of Kentucky, have invented certain new and useful Improvements in the Manufacture of Hydraulic Lime; and I do declare the following to be a full, clear, and exact description of the invention, such as will enable others skilled in the art to which it appertains to make and use the same.

The object of my invention is the manufacture of hydraulic cement from ordinary lime. I accomplish this object in the following manner: I take a suitable quantity of thoroughly-burned lump lime and divide it into two equal or nearly equal parts. I slake one part with a solution prepared as follows: In fifty gallons of water I place fifty pounds of crude potash, fifty pounds crude soda-ash, and fifty pounds alum, and boil till thoroughly dissolved. After this solution is cooled I may add from ten to fifty gallons of water, according to the nature of the lime to be treated. I either dip the lime in this solution or sprinkle it with the solution, giving it time to thoroughly slake, which will be from twelve to twenty-four hours. The other portion of lime I slake by dipping it into or sprinkling it with a sufficient quantity of sulphuric acid to thoroughly impregnate the lime, my object being to produce sulphate of lime as a substitute for what is known as "plaster-of-paris." After the two portions of lime thus treated have become thoroughly slaked and cooled I mix them together and grind the whole to a fine powder. I then have a pure white stainless hydraulic cement ready for immediate use.

The material thus produced will set and harden both in and out of water and possesses superior adhesive qualities, sets quickly, and becomes when thoroughly set as hard as rock. Applied as plaster for plastering a room it makes an exceedingly hard polished surface.

Instead of using the second portion of lime treated with sulphuric acid, as above described, I may use an equivalent quantity of plaster-of-paris as a substitute. Where gypsum can be cheaply procured, I use plaster-of-paris; but when it is too costly I use a sulphate of lime, produced as above described.

I prefer the above proportions and treatment, but may vary them somewhat, according to the character of the lime to be treated.

Having thus described my invention, what I claim as new, and desire to secure by Letters Patent, is—

The manufacture of hydraulic lime by combining with unslaked lime crude potash, crude soda-ash, alum, sulphate of lime, and water, in the manner and in the proportions set forth.

In testimony whereof I affix my signature in presence of two witnesses.

JOHN H. WRIGHT.

Witnesses:
   JOHN NAGEL,
   JAMES GRAY.